No. 620,626. Patented Mar. 7, 1899.
C. R. WEYMOUTH.
ELECTRIC MEASURING INSTRUMENT.
(Application filed Nov. 30, 1898.)
(No Model.)

Witnesses.
Tobias D. Weymouth.
James F. Jambow

Inventor.
Clarence R. Weymouth.

UNITED STATES PATENT OFFICE.

CLARENCE RAYMOND WEYMOUTH, OF ALAMEDA, CALIFORNIA.

ELECTRIC MEASURING INSTRUMENT.

SPECIFICATION forming part of Letters Patent No. 620,626, dated March 7, 1899.

Application filed November 30, 1898. Serial No. 697,928. (No model.)

*To all whom it may concern:*

Be it known that I, CLARENCE RAYMOND WEYMOUTH, a citizen of the United States, residing at No. 2017 Alameda avenue, in the city of Alameda, in the county of Alameda and State of California, have invented a new and useful Electrical Measuring Instrument, of which the following is a specification.

My invention relates to improvements in electrical measuring instruments which depend upon the electrodynamic action of currents in fixed and movable coils; and the objects of my improvements are to provide an arrangement and adjustment of circuits such that the readings of the instrument will not be influenced by either the wave form of the current or its frequency. I attain these objects by properly adjusting the various resistances and dimensions of coils and by the arrangement of circuits illustrated in the accompanying drawings, in which—

Figure 1:
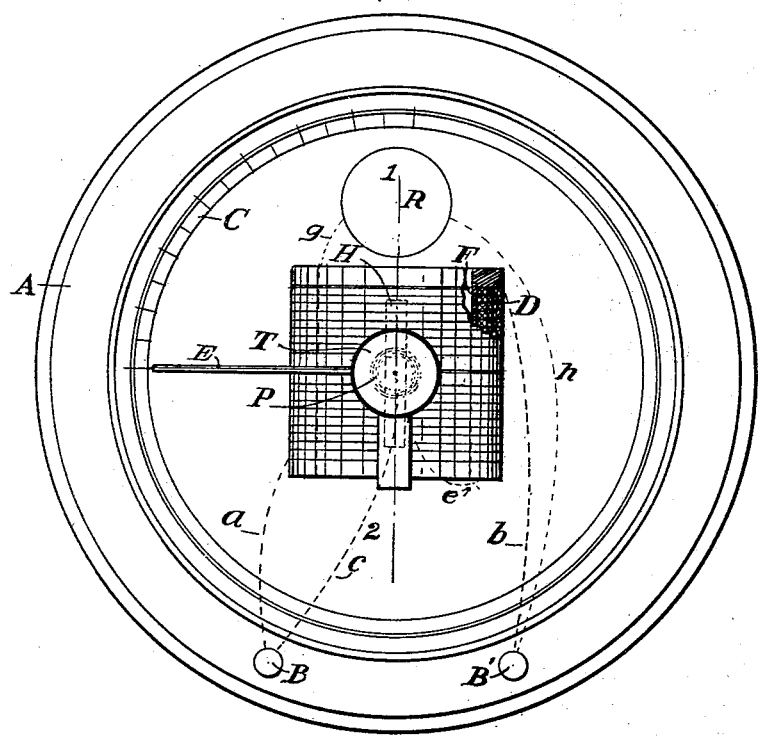
Figure 2:
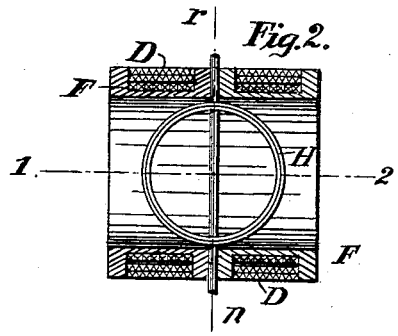

Figure 1 is a plan of the instrument, and Fig. 2 a vertical section of part of the instrument along the line 1 2.

Similar letters refer to similar parts throughout both views.

A is the base of the instrument, to which are fastened the terminals or binding-posts B and B'.

F and D are fixed coils.

H is a movable coil capable of rotation about the vertical axis $r\,n$, to which is fastened one end of the spiral spring P, the other end being fixed to the torsion-head T, the angular position of which is indicated by the needle E upon the scale C.

R is a coil in circuit of the movable coil H for adjusting the resistance and inductance of that portion of the circuit. The circuit divides at B, one branch being along $a$, through the coil D, along $b$ to B'. This circuit will be designated by B $a$ D $b$ B'. The other branch is from B along $c$ into the movable coil H, out along $e$ into the fixed coil F, out along $g$ into the coil R, and finally out along $h$ to B'. This circuit will be designated by B H F R B'. The currents in the two branches pass through the two fixed coils D and F in the same direction relative to the axis 1 2. The inductances in the two branches are so adjusted that when an alternate current is passed through the instrument the ratio of the current strengths in the two branches is equal to the inverse ratio of their resistances. If $I_0$ and $R_0$ are respectively the current and resistance in one branch, $I_1$ and $R_1$ are the current and resistance in the other branch. The condition to be fulfilled is expressed by the equation—

$$\frac{I_0}{I_1}=\frac{R_1}{R_0}.$$

When this condition is secured, a fixed proportion of the main current enters each branch, as will be shown later, and hence the indications of the instrument are independent of the frequency.

The object of winding F coaxial with D is to secure a relatively large inductance in the branch containing F with a relatively small number of convolutions.

The following considerations will show that the above conditions can be realized:

In branch B $a$ D $b$ B' let $I_1=$ current flowing, $R_1=$ resistance, and $h_1=$ coefficient of self-induction.

In branch B H F R B' let $I_2=$ current flowing, $R_2=$ resistance, and $h_2=$ coefficient of self-induction. Let M$=$ coefficient of mutual induction for the two branches. Let E$=$ the difference of potential between B and B' at any time. Then by well-known principles we have the following equations:

$$I_1=\frac{E-h_1\dfrac{dI_1}{dt}-M\dfrac{dI_2}{dt}}{R_1} \qquad (1)$$

$$I_2=\frac{E-h_2\dfrac{dI_2}{dt}-M\dfrac{dI_1}{dt}}{R_2} \qquad (2)$$

It is desired to find the conditions for which the ratio $\dfrac{I_1}{I_2}=r$ shall be independent of E and the wave form, $\left(\dfrac{dI_1}{dt},\dfrac{dI_2}{dt}\right).$ Then $$\frac{I_1}{I_2}=r=\frac{R_2}{R_1}\frac{E-h_1\dfrac{dI_1}{dt}-M\dfrac{dI_2}{dt}}{E-h_2\dfrac{dI_2}{dt}-M\dfrac{dI_1}{dt}}, \qquad (3)$$

and $$\frac{R_1}{R_2} r\, E - E = r\frac{R_1}{R_2}\left(h_2 \times \frac{d I_2}{d t} + M\frac{d I_1}{d t}\right) - \left(h_1\frac{d I_1}{d t} + M\frac{d I_2}{d t}\right) \quad (4)$$

In order that $r$ shall be independent of E, $\frac{d I_1}{d t}$, and $\frac{d I_2}{d t}$, the second member of (4) must be zero, hence its equivalent the first member, and we have $$\frac{R_1}{R_2} r\, E - E = 0,$$

$$r\frac{R_1}{R_2}\left(h_2\frac{d I_2}{d t} + M\frac{d I_1}{d t}\right) - h_1\frac{d I_1}{d t} - M\frac{d I_2}{d t} = 0 \quad (5)$$

From (5)
$$\frac{R_1}{R_2} r\, E - E = 0$$

and
$$\frac{R_2}{R_1} = r = \frac{I_1}{I_2} = \text{a constant quantity.}$$

Then
$$r\, I_2 = I_1$$

and
$$r\frac{d I_2}{d t} = \frac{d I_1}{d t} \quad (6)$$

which when substituted in (5) reduces to $$\frac{R_2}{R_1}\frac{R_1}{R_2}\left(h_2\frac{d I_2}{d t} + M\, r\frac{d I_2}{d t}\right) - r\, h_1\frac{d I_2}{d t} - M\frac{d I_2}{d t} = 0$$

or
$$h_2 + M\, r - r\, h_1 - M = 0 \quad (7)$$

and, finally,
$$r = \frac{M - h_2}{M - h_1}. \quad (8)$$

M, $h_1$, and $h_2$ being only dependent upon the geometrical form of the coils 8 can be satisfied by the proper adjustment of the various dimensions in the two circuits.

The operation of the instrument is as follows: The current divides, a portion passing through each branch. The motion of the movable coil is produced by the electrodynamic action between the convolutions of fixed and movable coils. The turning of the torsion-head brings the movable coil back to its initial position, and the couple due to electrodynamic action is balanced by the deflection of the spring connecting the torsion-head and movable coil. This couple is a measure of the current.

The principles of this invention can be applied to an instrument in which the coil H is deflected by the action of the currents until the deflecting force is balanced by the restoring force of the spring, and this deflection is also a measure of the current; but as this deflection alters the coefficient of mutual induction of the two branches the inductance of the movable coil must be made very small in order that the variation of the ratio of current strengths in the two branches, due to variation of the coefficient of mutual induction, may be practically *nil*.

I am aware that electrical measuring instruments with a fixed and a movable coil connected in series have been used prior to my invention, and therefore I do not claim such a combination; but What I do claim as my invention, and desire to secure by Letters Patent, is—

The combination in an electrical measuring instrument, having fixed and movable coils of a divided circuit, one branch containing a fixed coil D, the other branch containing a fixed coil F and a movable coil H, all substantially as set forth.

CLARENCE RAYMOND WEYMOUTH.

Witnesses:
 TOBIAS DELMONT WEYMOUTH,
 BENJAMIN FRANCIS SAMBOM.